United States Patent
Dunne et al.

(10) Patent No.: US 10,366,162 B2
(45) Date of Patent: *Jul. 30, 2019

(54) COGNITIVE ENTITY REFERENCE RECOGNITION

(71) Applicant: INTERNATIONAL BUSINESS MACHINES CORPORATION, Armonk, NY (US)

(72) Inventors: Jonathan Dunne, Dungarvan (IE); Robert H. Grant, Austin, TX (US); Jeremy A. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,558

(22) Filed: Dec. 17, 2017

(65) Prior Publication Data

US 2018/0232355 A1    Aug. 16, 2018

Related U.S. Application Data

(63) Continuation of application No. 15/434,279, filed on Feb. 16, 2017, now Pat. No. 10,180,937.

(51) Int. Cl.
*G06F 17/27* (2006.01)
*H04L 12/58* (2006.01)
(Continued)

(52) U.S. Cl.
CPC .......... *G06F 17/278* (2013.01); *G06F 17/279* (2013.01); *G06F 17/2785* (2013.01);
(Continued)

(58) Field of Classification Search
CPC .. G06F 17/30867; G06F 17/30; G06F 17/278; G06F 17/30345; G06F 17/30516;
(Continued)

(56) References Cited

U.S. PATENT DOCUMENTS 8,788,603 B2 * 7/2014 Griffin ................ H04L 12/1827
709/206
8,958,779 B2    2/2015 Ramer et al.
(Continued)

FOREIGN PATENT DOCUMENTS

WO    WO2002089408 A1    11/2002

OTHER PUBLICATIONS

Non-Final Office Action, U.S. Appl. No. 15/434,279, filed Feb. 16, 2017, dated Jan. 12, 2018.
(Continued)

*Primary Examiner* — Vijay B Chawan
(74) *Attorney, Agent, or Firm* — Maeve Carpenter, Esq.; George S. Blasiak, Esq.; Heslin Rothenberg Farley & Mesiti, PC (57) ABSTRACT

Methods, computer program products, and systems are presented. The methods include, for instance: monitoring one or more message of the conversation between multiple users for an entity reference; detecting the entity reference in a message in the conversation. An entity reference list stores previously established alternate name referring to a user in the conversation. By analyzing the message and following messages in the conversation for relevance of and sentiment to the entity reference, the entity reference is evaluated and if acceptable, the entity reference list is updated with the entity reference as a new alternate name to identify the user in subsequent messages.

7 Claims, 6 Drawing Sheets

(51) Int. Cl.
  *H04L 29/08* (2006.01)
  *G06N 20/00* (2019.01)
(52) U.S. Cl.
  CPC .............. *G06N 20/00* (2019.01); *H04L 51/16* (2013.01); *H04L 51/22* (2013.01); *H04L 51/32* (2013.01); *H04L 67/22* (2013.01)
(58) Field of Classification Search
  CPC ........... G06F 17/3053; G06F 17/30593; G06F 17/30699; G06F 3/04842; H04L 51/16; H04L 67/306; H04L 12/1813; H04L 29/06027; H04L 29/12009; H04L 29/12594; H04L 51/043; H04L 61/00; H04L 61/301; H04L 61/3065; H04L 65/403; H04L 67/24
  USPC ......... 707/754, 730; 709/204, 206; 704/4, 7, 704/10
  See application file for complete search history.

(56) References Cited

U.S. PATENT DOCUMENTS

| | | | |
|---|---|---|---|
| 9,225,676 B1* | 12/2015 | Shoham | H04L 51/32 |
| 2008/0005063 A1* | 1/2008 | Seeds | G06F 17/30592 |
| 2012/0095862 A1* | 4/2012 | Schiff | G06Q 30/06 |
| | | | 705/26.7 |
| 2012/0095863 A1* | 4/2012 | Schiff | G06Q 30/0631 |
| | | | 705/26.7 |
| 2013/0173611 A1* | 7/2013 | Wald | G06Q 50/01 |
| | | | 707/730 |
| 2014/0025692 A1* | 1/2014 | Pappas | G06F 17/30 |
| | | | 707/754 |
| 2014/0156681 A1* | 6/2014 | Lee | G06F 17/30867 |
| | | | 707/754 |
| 2014/0229407 A1* | 8/2014 | White | G06N 99/005 |
| | | | 706/12 |
| 2014/0331150 A1 | 11/2014 | Griffen et al. | |
| 2014/0337436 A1* | 11/2014 | Hoagland | G06F 17/30867 |
| | | | 709/204 |
| 2015/0161519 A1* | 6/2015 | Zhong | G06F 17/278 |
| | | | 706/12 |
| 2015/0379144 A1* | 12/2015 | Wong | G06F 17/30867 |
| | | | 707/754 |

OTHER PUBLICATIONS

Response to Non-Final Office Action, U.S. Appl. No. 15/434,279, filed Feb. 16, 2017, dated Feb. 27, 2018.
List of IBM Patent and/or Patent Applications treated as related for U.S. Appl. No. 15/434,279, filed Feb. 16, 2017, dated Dec. 17, 2017.
Dunne, et al. "Cognitive Entity Reference Recognition" U.S. Appl. No. 15/844,558, filed Dec. 17, 2017.
"Natural language processing", Wikipedia.org, [retrieved on Jan. 13, 2017]. Retrieved from the Internet:<URL:https://en.wikipedia.org/wiki/Natural_language_processing, 9 pgs.
Mell, Peter, et al., "The NIST Definition of Cloud Computing", NIST Special Publication 800-145, Sep. 2011, Gaithersburg, MD, 7 pgs.
List of IBM Patent and/or Patent Applications treated as related for U.S. Appl. No. 15/844,558, filed Dec. 17, 2017, dated Dec. 17, 2017.
Dunne, et al. "Cognitive Entity Reference Recognition" U.S. Appl. No. 15/434,279, filed Feb. 16, 2017.
Final Office Action, U.S. Appl. No. 15/434,279, filed Feb. 16, 2017, dated Jun. 8, 2018.
Response to Final Office Action, U.S. Appl. No. 15/434,279, filed Feb. 16, 2017, dated Aug. 27, 2018.
Notice of Allowance, U.S. Appl. No. 15/434,279, filed Feb. 16, 2017, dated Sep. 17, 2018.
Applicant's Amendment after Notice of Allowance (Rule 312), U.S. Appl. No. 15/434,279, filed Feb. 16, 2017, dated Oct. 25, 2018.
Dunne, et al. "*Cognitive Entity Reference Recognition*", U.S. Appl. No. 16/198,291, filed Nov. 21, 2018.
List of IBM Patent and/or Patent Applications treated as related for U.S. Appl. No. 15/844,558, filed Dec. 17, 2017, dated Jan. 30, 2019.

* cited by examiner

```
301:    Hey Rob, can you call me about tonight?
302:    Hey, Ya I can do that in 10.

311:    Hey Rob, you want to join us tonight?
312:    Hey Natedog, yes definitely, I will see you guys
        there. Are you planning on bringing anything?
313:    Yes, if you want to bring some chips, it would
        be great.
```

COGNITIVE ENTITY REFERENCE RECOGNITION

CROSS-REFERENCE TO RELATED APPLICATION

This application is a continuation of U.S. patent application Ser. No. 15/434,279, filed Feb. 16, 2017, entitled, "Cognitive Entity Reference Recognition," the entirety of which is hereby incorporated herein by reference.

TECHNICAL FIELD

The present disclosure relates to cognitive computing technology, and more particularly to methods, computer program products, and systems for recognizing names referring to a certain entity and assisting participants of a conversation with the name-entity associations.

BACKGROUND

In conventional group messenger applications, participants may not recognize alternate names referring to a certain user as some users may use one alternate name and other users may use another alternate name. All participants in a group conversation may not be aware of all nicknames for other participants, which may be made up during the conversation. Accordingly, users need to exchange messages only to identify which name refers to whom during the group conversation.

SUMMARY

The shortcomings of the prior art are overcome, and additional advantages are provided, through the provision, in one aspect, of a method. The method for recognizing a reference to an entity from a conversation includes, for example: monitoring, by one or more processor, one or more message of the conversation between two or more users for an entity reference, wherein the two or more users have respective user profiles including respective user names; detecting the entity reference in a message of the one or more message from the monitoring, the entity reference being not present in an entity reference list, wherein the entity reference list includes zero or more alternate name referring to a user of the two or more users, wherein an alternate name is distinctive from the respective user names; analyzing the message and following messages in the conversation for relevance of the entity reference and sentiment associated with the entity reference; determining that the entity reference is appropriate for later use based on the analyzing and respective thresholds for relevance and sentiment; and updating the entity reference list with the entity reference as a new alternate name for the user such that the user may be identified by use of the new alternate name in subsequent messages.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
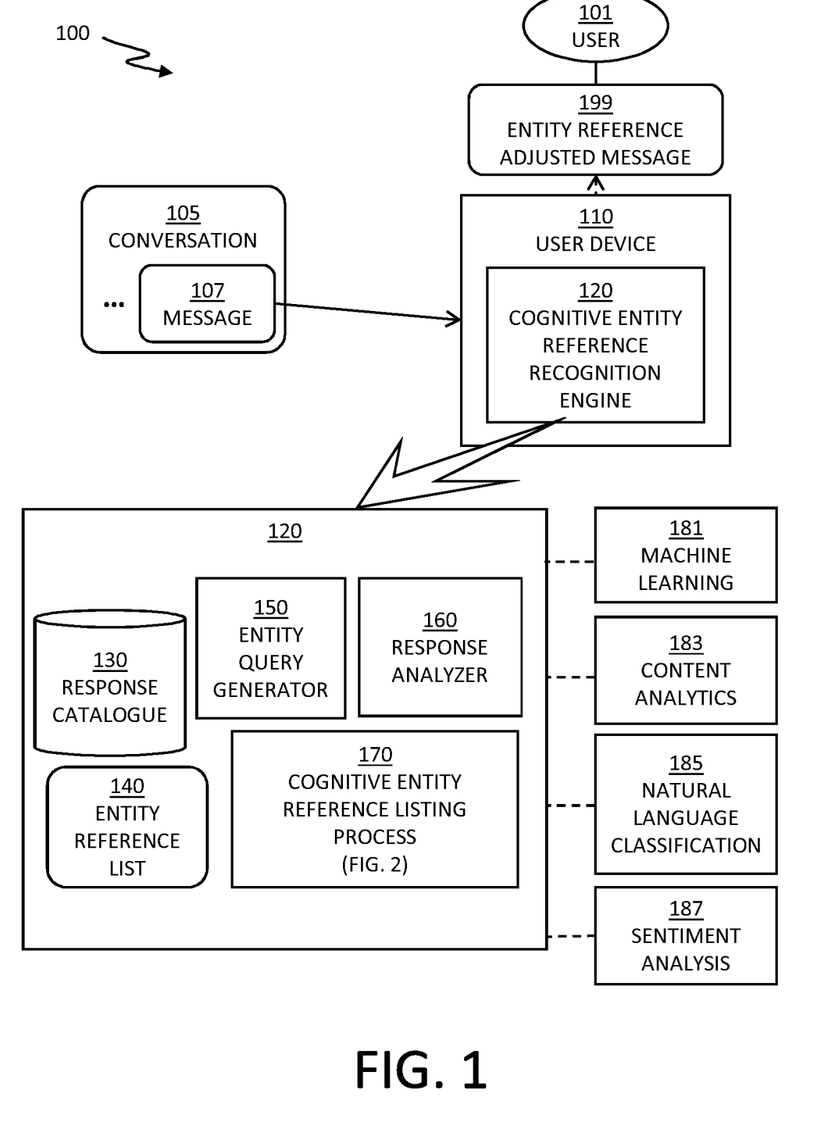
FIG. 1 depicts a system for cognitive entity reference recognition, in accordance with one or more embodiments set forth herein.

FIG. 1 depicts a system 100 for cognitive entity reference recognition, in accordance with one or more embodiments set forth herein.

The system 100 includes a user 101, a user device 110, and one or more message in a conversation 105. The conversation 105 is conducted over a telecommunication network amongst one or more group of users, by use of compatible messaging application programs running on respective user devices. The telecommunication network and the messaging application programs are not shown in the system 100, as the conversation 105 may take place by use of conventional telecommunication environments and messaging tools not within the scope of this specification. The user device 110 runs a cognitive entity reference recognition engine 120 that dynamically recognizes references to users/groups from the conversation 105 and presents an entity reference adjusted message 199 to the user 101 for a corresponding message 107 from the one or more message in the conversation 105.

The cognitive entity reference recognition engine 120 includes a response catalogue 130, an entity reference list 140, a query generator 150, a response analyzer 160, and a cognitive entity reference listing process 170. The cognitive entity reference recognition engine 120 may employ various external service utilities including a machine learning process 181, a content analytics process 183, a natural language classification process 185, and a sentiment analysis process 187. The machine learning process 181 may be utilized to create appropriate responses to a preceding message, as trained by actual conversation messages. The content analytics process 183 may be utilized to analyze topics of the conversations, etc. The natural language classification process 185 may be used to classify the messages as well as components of the messages as employed by the query generator 150. The sentiment analysis process 187 may be used to assess sentiments associated with entity references by the response analyzer 160, as used by the cognitive entity reference listing process 170 to evaluate the entity references.

The response catalogue 130 stores messages that may be provided responsive to a preceding message in conversations. The response catalogue 130 may be created by use of, but not limited to, past messages and conversations, various external service utilities including the machine learning process 181 and the content analytics process 183, etc. In certain embodiments of the present invention, a message of the response catalogues 130 may be associated with other responses suitable for the preceding message, respective sentiment associated with each response, the context of the patterns stored in the response catalogue 130, etc.

The entity reference list 140 stores one or more entity names that may be used in displaying the entity names in messages for the user 101. A user may have a registered user name, a chat name configured for each conversation thread, or one nickname used for all conversations, etc., as updated by the cognitive entity reference listing process 170. The entity reference list 140 stores the one or more entity names and display the most relevant name for the participants of the conversation. An exemplary message displays for respective participants in a same conversation is presented in FIG. 3B and corresponding description.

The query generator 150 creates a query upon detecting a new entity reference appearing in the message 107, which is not stored in the entity reference list 140. In this specification, the term "classifier" refers to a group of words that is likely to contain a name for a person. For example, in a message to a user named "Robert" stating "Hi, Bob, how are you doing?", "Hi/Bob/you/?" is a classifier that includes a greeting "Hi", followed by an unknown term of address "Bob", and followed by the second person pronoun "you", in an interrogative sentence marked by a question mark (?). The classifier "Hi/Bob/you/?" signifies that the unknown term of address "Bob" is likely to indicate the user "Robert" to whom the message is being addressed. Also in this specification, the term "query" refers to an inquiry as to if the alternate reference appearing in the classifier refers to the entity, and includes the classifier, the user, and an alternate reference to the user. In the previous example, the query (Classifier, User, AltName) may be instantiated as (Classifier=hi/Bob/you/?, User=Robert, AltName=Bob), inquiring if "Bob" refers to the user "Robert" by user of the classifier "hi . . . you . . . ?", to whom the message is being addressed. The query generator 150 may utilize one or more external service utilities, including the content analytics process 183 and the natural language classifier 185, etc.

The response analyzer 160 analyzes contexts of conversations and determines whether or not the new entity reference is proper and relevant within the context of the conversation. Further the response analyzer 160 may utilize external service utilities such as the sentiment analysis process 187 to assess sentiment associated with the response in using the new entity reference.

The cognitive entity reference listing process 170 passively monitors messages of the conversation 105, detects a new entity reference from the messages, and processes the entity reference by coordinating and controlling operations of the query generator 150 and the response analyzer 160, and by utilizing and updating data stored in the response catalogue 130 and the entity reference list 140. Detailed process of the cognitive entity reference listing process 170 is presented in FIG. 2 and corresponding description.

While using messaging services for groups, participants in a group conversation may use various names to refer to one user. The group conversation is ordinarily conducted by use of group chat applications and/or group text messengers. Over time, the names may evolve to other names and if the participants do not follow the group conversation closely, it would be very difficult for such infrequent participants to understand who is talking about whom. Similarly, wherein one user is called by many names, participants of the group conversation may not understand who is addressed by what name, may forget some names while remembering others, etc., and the group conversation may be frequently interrupted due to the inconsistency in the terms of address amongst the participants. Conventional messaging applications uses rudimentary manual setting of one or more chat name, which does not reflect the terms of address for respective users in the ongoing conversation.

Certain embodiments of the present invention dynamically recognizes terms of address associated with entities from conversation messages as entity references based on relevance and semantics of the language, analyzes the sentiment accompanying the entity references, and registers the entity references that are positively accepted for future usage. Further, based on the characterization of the groups, certain alternate names may be further evaluated for the appropriateness. For example, for a group conversation amongst high school friends, rather informal nicknames for one user may be evaluated as acceptable, while the same informal nicknames for the same user may be evaluated as inappropriate for another group conversation amongst work colleagues.

Figure 2:
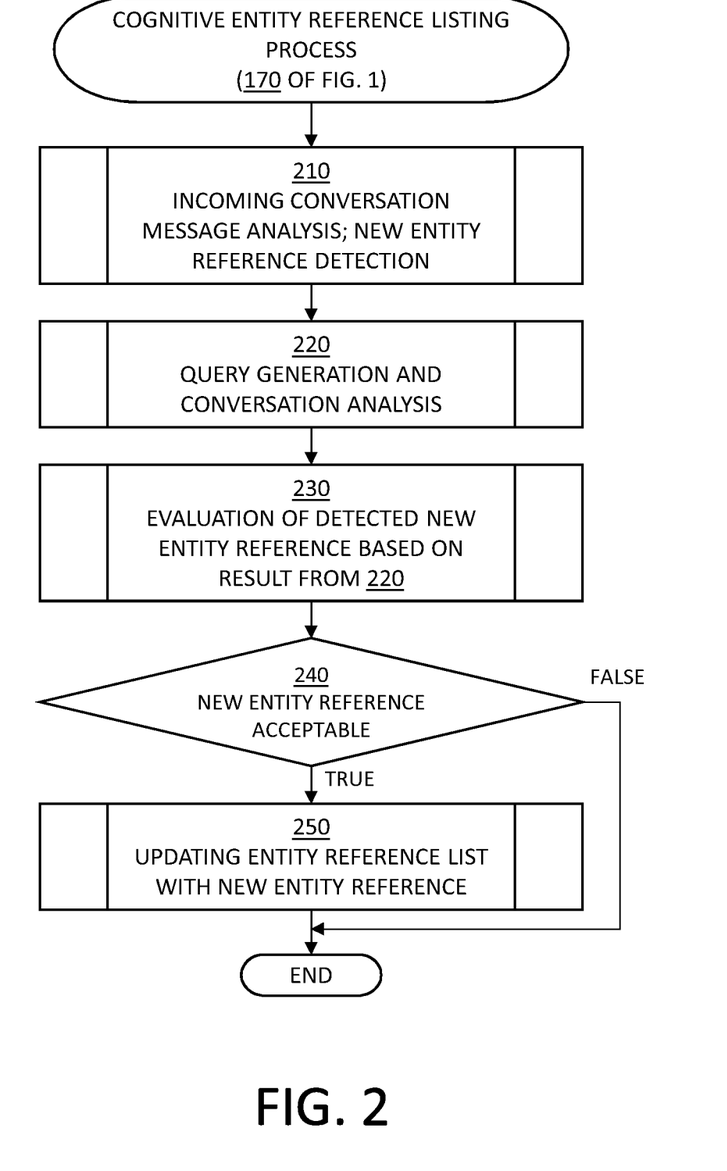
FIG. 2 depicts a flowchart performed by the cognitive entity reference listing process of FIG. 1, in accordance with one or more embodiments set forth herein.

FIG. 2 depicts a flowchart performed by the cognitive entity reference listing process 170 of FIG. 1, in accordance with one or more embodiments set forth herein.

Each of blocks 210 through 250 is a predefined process, in which multiple operations may be performed to achieve respective functionalities. In preparation of running the cognitive entity reference listing process 170, a user profile including user name information had been configured either manually by a user or automatically by the cognitive entity reference recognition engine 120 for each user.

In block 210, the cognitive entity reference listing process 170 monitors messages of a conversation in real-time and detects a new reference to an entity and use contexts of the new reference in a message by analyzing individual messages of the conversation. As entities in the conversation are people and people refer to other people by respective names, the references to entities may be names of participants in the conversation, and may be detected by natural language classification on the subject word, sentence structure analysis as well as part of speech analysis, including but not limited to positions relative to, greetings, punctuations, beginning and/or end of a sentence, etc. If one of the participants in the conversation refers to another participant by using an alternate name other than what is already known to other participants, as stored in the entity reference list 140, the cognitive entity reference listing process 170 may detect such alternate name. A participant may belong to multiple conversation group based on the relationships amongst members of each conversation group, in which the participant may be referred to by distinctive names. For example, a user may have a respective conversation thread with family members who call the user "Eddy", with colleagues who call the user "Ed", and with bowling teammates who call the user "Little Ed", etc. The cognitive entity reference listing process 170 detects the alternate reference as a new reference if the alternate reference is not discovered in the entity reference list 140, in which the new reference would be stored, as resulting from block 250. Exemplary usage of multiple alternate references to one entity is presented in FIG. 3B and corresponding description. Then the cognitive entity reference listing process 170 proceeds with block 220.

In block 220, the cognitive entity reference listing process 170 creates a query for an alternative name detected in block 210 and initiates analysis of subsequent messages in the conversation. The query for the alternate name may include a classifier and additional attributes, including the alternate name and/or usage context of the alternate name. Then the cognitive entity reference listing process 170 proceeds with block 230.

In certain embodiment of the present invention, the cognitive entity reference listing process 170 may create the query based on the context of messages in the conversation, even the alternate name had not been detected in block 210 because the alternate name was not a typical entity reference such as a proper noun and/or other candidate words/phrases. In certain embodiment of the present invention, the classifier of the query may be obtained by an external service utility such as a natural language classifier. For example, a query having a classifier "hey/Rob/you/?" and AltName "Rob" may be created based on a message from Nathan to Robert stating "Hey, Rob, can you call me?" for "User=Robert". In the same example, the query may further include usage contexts representing circumstances in which the alternative name "Rob" is used for the user "Robert", such as a specific group of participants in a conversation, a particular user who used a specific alternative name, etc. Accordingly, the query may further include "Attribute:Group=ABC High" as Robert and Nathan are in a group chat titled ABC High, "Attribute:UsedBy=Nathan" as Nathan used the AltName "Rob", and/or additional alternative name and usage contexts that had been previously detected as an alternative reference to the user Robert and stored in the entity reference list.

In block 230, the cognitive entity reference listing process 170 evaluates the entity reference detected in block 210 based on the subsequent message in the conversation, as analyzed from block 220. Then the cognitive entity reference listing process 170 proceeds with block 240.

In certain embodiments of the present invention, the entity reference may be evaluated for relevance, sentiment, confidence, and combinations thereof, wherein the relevance indicates how accurately the entity reference designates an entity participating in the conversation and conversely may be measured by how accurately the user responds to the message in subsequent messages in the conversation. In the same embodiment of the present invention, the sentiment indicates how positively or negatively the entity reference is perceived by the entity being designated and/or other participants of the conversation, which may be measured by examining how positively or negatively the user responds to the entity reference in the following messages. In the same embodiment of the present invention, the confidence indicates how confident the participants may be on referring the entity by the entity reference based on the number of comparable references. For example, the cognitive entity reference listing process 170 may assign a very high level of confidence on an "AltName=Ed", or "AltName=Eddy" for "User=Edward", but would assign a very low level of confidence on an "AltName=Jack" for "User=Edward", based on the number of entity references in historical data for past conversations. In certain embodiments of the present invention, the cognitive entity reference listing process 170 evaluates the entity reference in two stages, first by relevance and next by sentiment, such that the entity reference may be reasonably accurate in referring to the entity and the reference is reusable as being positively perceived. Exemplary entity reference evaluation is described in FIG. 3A and corresponding description.

In block 240, the cognitive entity reference listing process 170 determines whether or not the new entity reference detected from block 210 is acceptable such that the new entity reference may be reused to refer to the entity in later messages of the same conversation thread as well as other conversations. In certain embodiments of the present invention, the cognitive entity reference listing process 170 may determine the acceptability of the new entity reference by use of, inter alia, a respective range of applicable metric values, respective thresholds for cut-off for each applicable metrics, etc., depending on the methods of evaluation from block 230. For example, if the relevance of the entity reference is quantified as a score during evaluation of block 230, then the acceptability test may be a range of relevance scores. Also in the same example, the relevance of the entity reference may be classified in one of three levels including low, medium, and high, indicating medium to high level of relevance to be acceptable. For another example, if the sentiment of the entity reference is evaluated as one of three categories including positive, neutral, and negative, then acceptability test may be a cut-off for the entity reference associated with a negative sentiment, and the entity reference associated with either positive or neutral sentiment may be acceptable. Sentiments may be evaluated for the new entity reference on the message wherein the new entity reference first appeared, subsequent messages responding to the new entity reference, and/or any comment on the new entity reference within the group conversation, etc. If the cognitive entity reference listing process 170 determines that the new entity reference is acceptable, then the cognitive entity reference listing process 170 proceeds with block 250. If the cognitive entity reference listing process 170 determines that the new entity reference is not acceptable, then the cognitive entity reference listing process 170 concludes processing the new entity reference detected in block 210.

In block 250, the cognitive entity reference listing process 170 updates the entity reference list 140 with the new entity reference such that the new entity reference may be reused to identify the entity as an alternate name, as established in blocks 220 through 240. Exemplary usage of multiple alternate references to one entity is presented in FIG. 3B and corresponding description. The user 101 may manually remove or edit entity references in the entity reference list 140, and/or may turn on and turn off the cognitive entity reference recognition engine 120 on the user device 110. Also the alternate references may be distinctive for respective groups and/or conversations for the same user, and based on analyzing participants and known entity references of the participants, entity references may be transferred from other entity reference lists of the participants. In certain embodiments of the present invention, updated entity reference list 140 may be synchronized with other entity reference lists on user devices of respective participants of the same group conversation. Then the cognitive entity reference listing process 170 concludes processing the new entity reference detected in block 210. The cognitive entity reference listing process 170 iterates blocks 210 through 250 as a unit while passively monitoring messages in conversations.

Figure 3A:
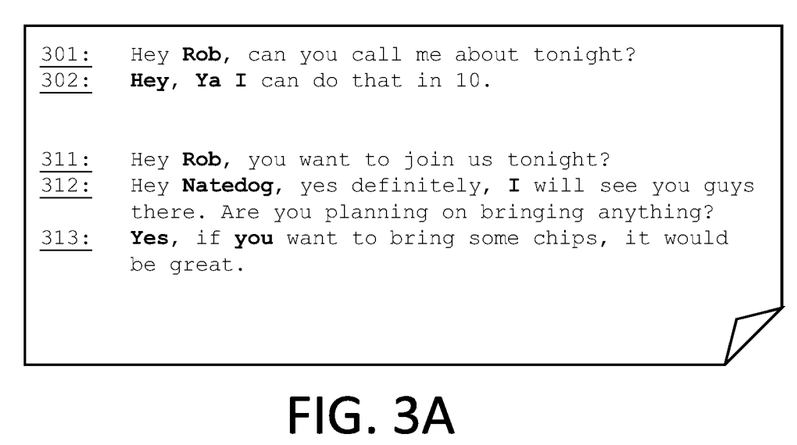
FIGS. 3A and 3B depict exemplary conversation messages as processed by the cognitive entity reference listing process, in accordance with one or more embodiments set forth herein.
Figure 3B:
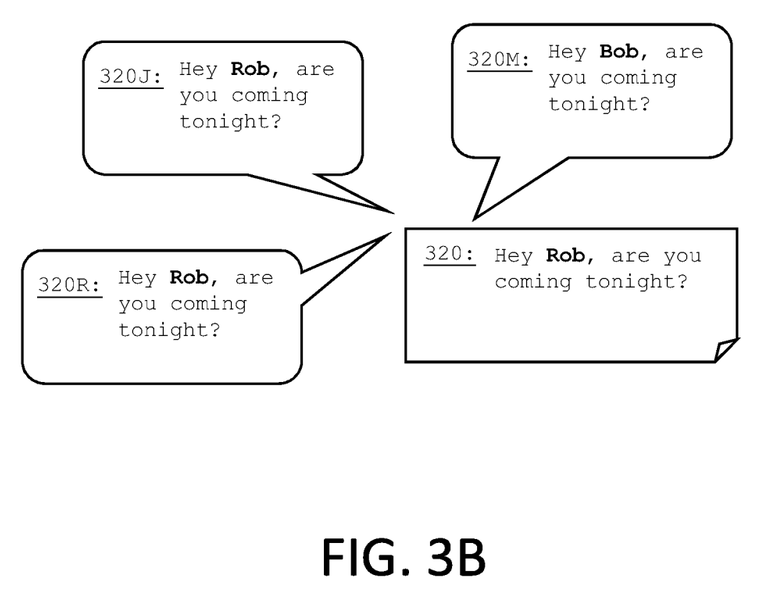

FIGS. 3A and 3B depict exemplary conversation messages as processed by the cognitive entity reference listing process 170, in accordance with one or more embodiments set forth herein.

Prior to running the cognitive entity reference recognition engine 120 application program, both Robert and Nathan had filled out respective user name information in the respective user profile for the cognitive entity reference recognition engine 120 application program running on the respective user devices. Both users may have configured the respective entity reference lists that catalogues nicknames for people in the conversations. The cognitive reference recognition engine 120 application program may run as an add-on and/or plug-in program for conventional messaging applications.

In the conversation of 301 and 302 of FIG. 3A, Robert and Nathan are participating in a group chat for Group A of close friends. In message 301, Nathan asks if Robert wants to join them in plans for the evening. Boldfaced "Rob" in message 301 indicates a nickname of Robert used in the group chat A. If the cognitive entity reference listing process 170 detects "Rob" in message 301 for the first time, the cognitive entity reference listing process 170 generates a query if "Rob" is a usable nickname for the user "Robert" and proceeds with analyzing message 302 to see how the alternate name "Rob" is responded. In message 302, the cognitive entity reference listing process 170 extracts "Hey", "Ya", and "I", and evaluates the alternate name "Rob" as relevant to "Robert" as well as associated with an positive/neutral sentiment based on "Hey/Ya/I" in a declarative statement, which properly responds to message 301 as if the registered user name "Robert" has been used. Accordingly, the cognitive entity reference listing process 170 updates the entity reference list with the nickname "Attribute: AltName=Rob" for "User=Robert" as "Attribute: UsedBy=Nathan" or "Attribute:UsedBy=Group A".

Further in the conversation of 311 through 313 of FIG. 3A, Robert and Nathan are exchanging messages, following the conversation of 301 and 302. In message 311, Nathan addresses Robert with a nickname "Rob", which had been previously registered as above. In message 312, Robert uses a new term of address "Natedog" in responding to message 311 as well as asking another question "Hey/Natedog/yes; Are/you/?". As in analyzing message 302, the cognitive entity reference listing process 170 detects "Natedog", generates a query if "Natedog" is a usable nickname for the user "Nathan" and proceeds with analyzing message 313 to see how the new alternate name "Natedog" is responded. In message 313, the cognitive entity reference listing process 170 extracts "Yes", "you", and "great", and evaluates the alternate name "Natedog" as relevant to "Nathan" as well as associated with an positive/neutral sentiment based on "Yes/great" used in a declarative statement, which properly responds to message 312 as if the registered user name "Nathan" has been used. Accordingly, the cognitive entity reference listing process 170 updates the entity reference list with the nickname "Attribute:AltName=Natedog" for "User=Nathan" as "Attribute: UsedBy=Robert". Further, the cognitive entity reference listing process 170 may be configured to permit all participants in the same group chat to use the nickname in the entity reference list without further evaluation, as the group chat members may share similar recognition and sentiment for the nickname as other participants.

In another conversation having message 320 of FIG. 3B, Robert, Mark, and Jane are exchanging messages, in another group chat for a book club. Jane and Robert are college friends and, because Robert goes by "Rob" amongst the college friends, Jane calls Robert Rob. Mark and Robert are work colleagues, and, because Robert goes by Bob at work, Mark calls Robert Bob. Both nicknames "Rob" and "Bob" are stored in the entity reference list for "Robert" in respective user devices for Jane and Mark. In message 320, Jane is asking Robert a question by calling Robert by one of the nicknames "Rob". On the user device of Jane, message 320J with the nickname "Rob" is displayed as Jane used. On the user device of Robert, message 320R with the nickname "Rob" is displayed as Jane used such that Robert would know that Jane asked the question. On the user device of Mark, message 320M with the nickname "Bob" is displayed because Mark is not familiar with Robert going by "Rob" and Mark may be confused with the nickname "Rob".

Certain embodiments of the present invention may offer various technical computing advantages in assisting users, including automated cognitive entity reference detection and customized replacement for respective users in group conversation messages. Multiple terms of address for a user in a group conversation may be stored in an entity reference list on respective user devices and synchronized for participants of the same group conversation such that the recorded entity references would be recognized as nicknames for the user later. A new entity reference would be detected by content analytics and natural language classification of words and/or messages forming a context for the entity reference. The new entity reference is evaluated by relevance, confidence, and sentiment associated with the entity reference such that only a relevant and associated with a positive sentiment would be accepted for repeated usage. Certain embodiments of the present invention improves efficiency and accuracy in identifying one user by numerous alternate names, as well as presents individualized display of alternate names pursuant to familiarity of individual users for respective names. Certain embodiments of the present invention assists participants of a group conversation by preventing confusion as to the association of certain alternate names and respective participants and by preventing repetitive exchange of messages to identify who is referred to by what name, resulting in reduced and more efficient use of network traffics. Certain embodiments of the present invention may be implemented as an add-on or plug-in features of conventional messenger applications such that more focused and efficient cognitive entity reference recognition and processing would be available than in messenger applications with integrated entity reference recognition functionalities.

Figure 4:
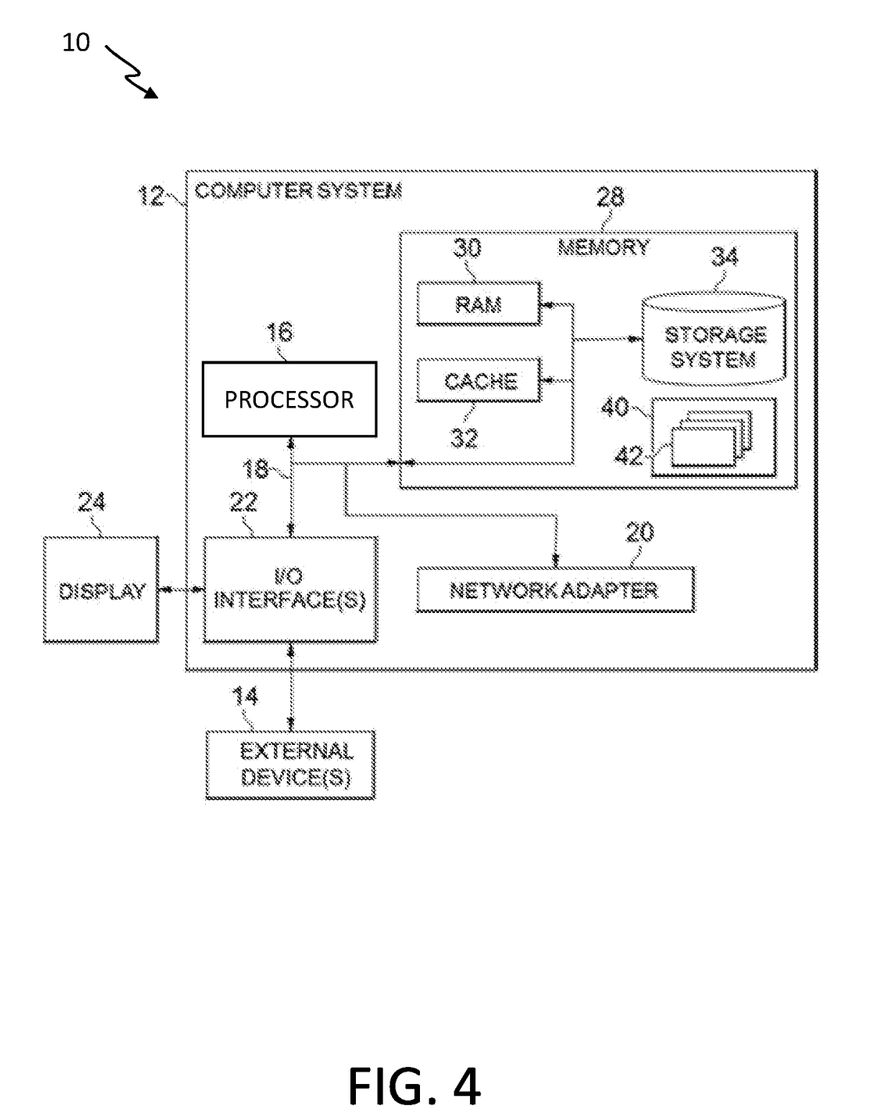
FIG. 4 depicts a cloud computing node according to an embodiment of the present invention.
Figure 5:
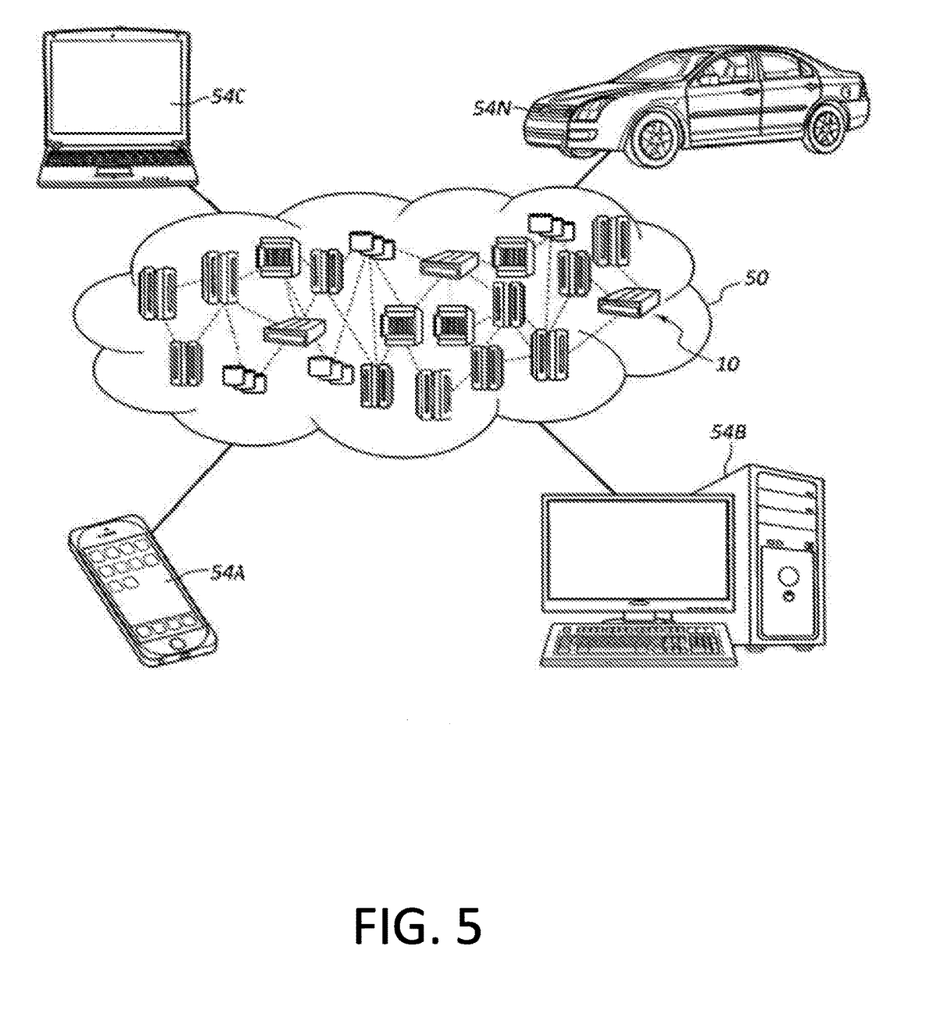
FIG. 5 depicts a cloud computing environment according to an embodiment of the present invention.
Figure 6:
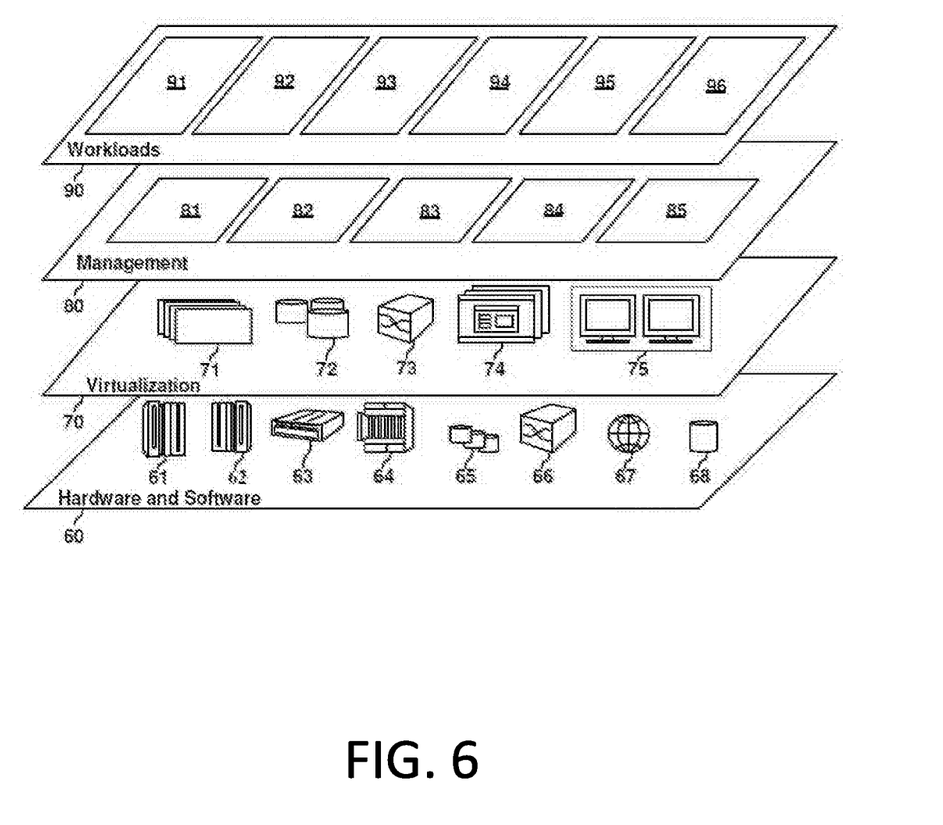
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive entity reference recognition engine 120 including the cognitive entity reference listing process 170 of FIG. 1. Program processes 42, as in the cognitive entity reference recognition engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 running the cognitive entity reference recognition engine 120 of FIG. 1 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive entity reference recognition engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for recognizing a reference to an entity from a conversation, comprising:
   monitoring, by one or more processor, one or more message of the conversation between two or more users for an entity reference, wherein the two or more users have respective user profiles including respective user names;
   detecting the entity reference in a message of the one or more message from the monitoring, the entity reference being not present in an entity reference list, wherein the entity reference list includes zero or more alternate name referring to a user of the two or more users, wherein an alternate name is distinctive from the respective user names;
   analyzing the message and following messages in the conversation for relevance of the entity reference and sentiment associated with the entity reference;
   determining that the entity reference is appropriate for later use based on the analyzing and respective thresholds for relevance and sentiment; and
   updating the entity reference list with the entity reference as a new alternate name for the user such that the user may be identified by use of the new alternate name in subsequent messages.

2. The computer implemented method of claim 1, the detecting comprising: ascertaining that the entity reference refers to a person based on word classification, analysis of a sentence structure and/or part of speech of the message.

3. The computer implemented method of claim 1, wherein an entity reference of the entity reference list is identified by User attribute instantiated with a user name from a user profile of the user, wherein the User attribute includes an attribute selected from the group consisting of: AltName attribute being instantiated with the entity reference that identifies the user having the user name on the user profile; UsedBy attribute being instantiated with another user name who used the entity reference of an AltName attribute to refer to the user who has the user name on the user profile; Group attribute being instantiated with a title of the conversation to collectively represent all participants of the conversation.

4. The computer implemented method of claim 1, the analyzing comprising: determining the relevance of the entity reference as measured by how accurately the user responds to the message in the following messages; and determining the sentiment of the entity reference as measured by how positively or negatively the user responds to the entity reference in the following messages, wherein the relevance and the sentiment may be obtained by use of various external services selected from a machine learning process, a content analytics service, a natural language classification service, a sentiment analysis service, and combinations thereof.

5. The computer implemented method of claim 1, the analyzing further comprising: determining a confidence level of the entity reference as measured by a number of other comparable entity references from past messages and conversation records.

6. The computer implemented method of claim 1, further comprising: discovering that a first user refers to the user by a first alternate name in a first message of the conversation, wherein the user, the first user, and a second user participating in the conversation, and wherein the entity reference list stores the first alternate name for the user as used by the first user and a second alternate name for the user as used by the second user; and displaying, on a device of the second user, the first message with the second alternate name referring to the user in place of the first alternate name such that the second user may recognize that the first message is addressed to the user without knowing that the first user refers to the user by the first alternate name.

7. The computer implemented method of claim 1, the determining comprising: ascertaining that the relevance of the entity reference is medium to high, indicating that the entity reference is reasonably relevant; and ascertaining that the sentiment of the entity reference is neutral or positive, indicating that the entity reference is associated with acceptable sentiment.

* * * * *